Oct. 30, 1956     E. W. SILVERTOOTH     2,768,785

PLANIMETER

Filed Oct. 5, 1953

INVENTOR
ERNEST W. SILVERTOOTH
BY
*F. Munro Redman*
ATTORNEY 2,768,785
Patented Oct. 30, 1956

United States Patent Office 2,768,785

PLANIMETER

Ernest W. Silvertooth, La Crescenta, Calif., assignor to Librascope, Incorporated, Glendale, Calif., a corporation of California Application October 5, 1953, Serial No. 384,197

12 Claims. (Cl. 235—61)

This invention relates to devices for measuring irregular areas, and particularly to an instrument for registering the summation of the square roots of the ordinates under a curve.

It is common practice in industry to record varying operational factors by means of continuously functioning instruments. Planimeters, or other devices for measuring and indicating the area under such graphic records, are well known. In certain applications it may be necessary to measure some power or other arbitrary function of the ordinates under a curve.

An example of this sort is found in the field of gas distribution, in which producing companies commonly deliver through large pipe lines to local utilities or large consumers. The measurement of the quantity of gas delivered through a pipe, in terms of the B. t. u. content, is difficult, in view of the number of variables involved. An acceptable formula has been found in which the charge made is proportional to the square root of the quantities recorded on strip charts by flowmeters of the type commonly used in this industry.

These meters plot values proportional to the square of the flow as a function of time on continuous strip charts. At appropriate intervals, usually at the end of each twenty-four hour period, the recorded portion is cut off so that measurements may be made on it.

In order to determine the total flow for a given interval of time, it is necessary to measure each ordinate of the recorded flow, extract the square root, and integrate with respect to time.

Extraction of square root values accurately with conventional mechanical analog devices is impossible in the vicinity of zero. This is because of the infinite slope of the square root function at the origin, with the concomitant infinite mechanical disadvantage. In consequence, the use of flowmeter strip charts has required laborious and time-consuming calculations.

The present instrument is designed to compute and register automatically the square root of each ordinate under a curve as it is traced by a cursor. It overcomes the difficulties in the prior art by using a square function cam to drive the cursor with which the operator follows the curve. By this arrangement, the angular position of the cam is linearly proportional to the quantity of gas flow, and this value is introduced directly to the ball carriage of an integrator of the ball and disk type. No mechanical disadvantage is experienced, since the slope of a square function is zero at the origin. By using a cam whose radius is proportional to a power other than 2 of the angle of rotation, the instrument may be used to register the summation of other whole or fractional powers of the ordinates under a curve. Likewise, a summation of arbitrary functions of the ordinates may be obtained thru the use of a cam whose radius varies in proper relation to the function.

No error is introduced into the integration by variations in the speed of the motor, since the same motor drives the chart past the inspection station and supplies the time base to the integrator disk. The integration process may begin and end at the chart extremes. No "leader," or excess chart length, is required.

It will be seen that the primary object of the invention is to provide improved means for the measuring and computing of the summation of the square roots of the ordinates under a strip chart record.

Another object is to provide an instrument by means of which a direct reading of power or other arbitrary functions of recorded curves may be obtained.

These and other objects will be apparent from the detailed description of the apparatus hereafter.

The invention is shown in the accompanying drawings in which

Figure 1:
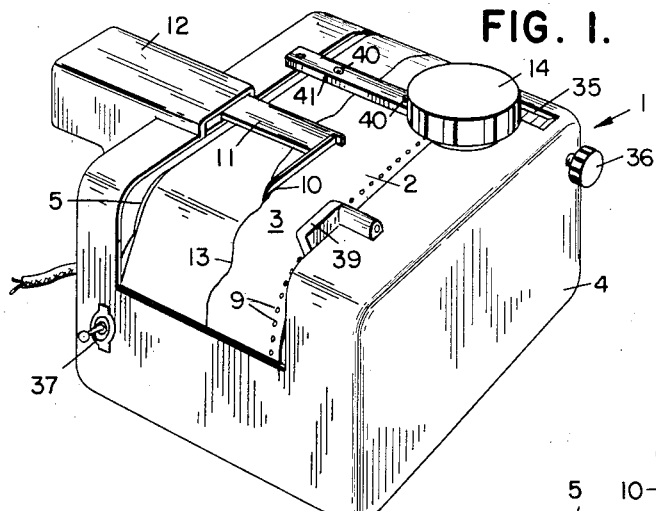
Figure 1 shows a complete instrument in perspective.
Figure 3:
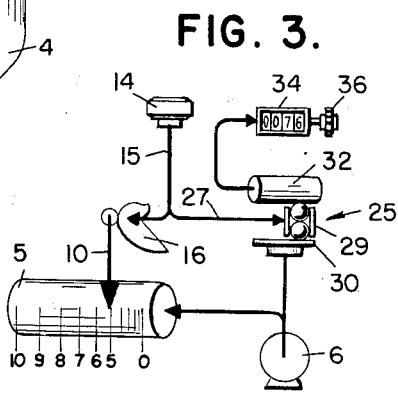
Figure 3 is a functional schematic diagram of the instrument.
Figure 2:
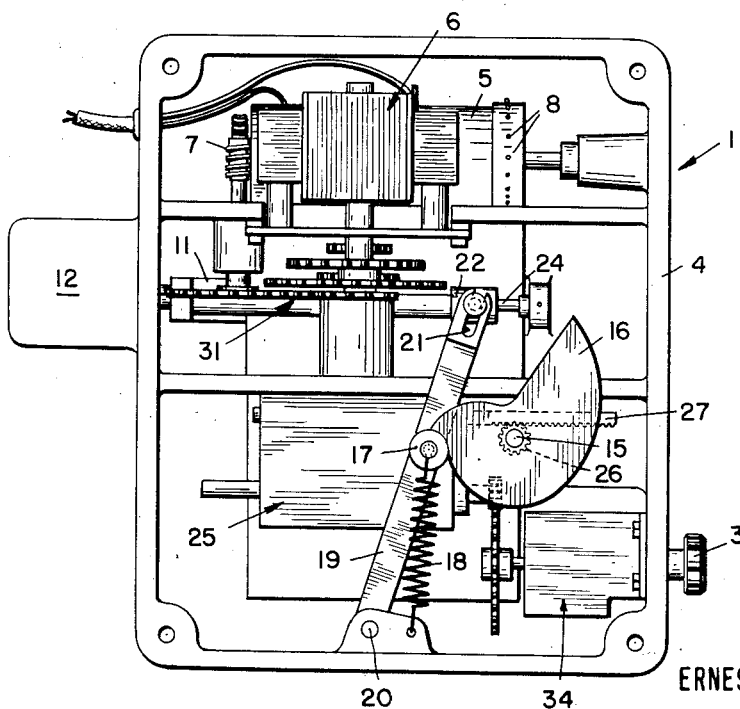
Figure 2 is a bottom view showing the interior mechanism.

In Figure 1 there is shown an instrument, generally indicated as 1, arranged to present flat for examination a strip chart 2, having a curve recorded thereon, at an inspection station 3 on the case 4. The chart 2 is traversed past the inspection station 3 by means such as a drum 5. The drum 5 may be driven by a motor 6 thru a worm and gear 7, and have sprocket teeth 8 arranged to engage corresponding perforations 9 in the strip chart to provide a non-slipping drive. At the inspection station, a cursor 10 is arranged for movement across the direction of travel of the strip chart. The cursor 10 has the form of a point or stylus arranged close to, but not in contact with, the strip chart. The cursor 10 is supported by an arm 11, which is slidably mounted for movement in a straight line only in a cursor arm housing 12. The arm 11 is arranged to move smoothly within its housing 12 at exactly right angles to the direction of traverse of the strip chart 2, the displacement of the arm 11 and cursor 10 to follow a curve 13 being manually controllable by a knob 14.

The knob 14 is conveniently located so that the operator may readily use it to adjust the position of the cursor 10 to follow curve 13 on the chart as he views it at the inspection station 3. The mechanism is so arranged that the movement of the cursor is proportional to the square of the rotation imparted to the knob. To obtain this result, the knob 14 is mounted on a shaft 15 which carries a square cam 16. Cam 16 in turn communicates a displacement proportional to the square of the rotation of shaft 15 to the cursor 10 through a cam follower 17.

Cam follower 17, held against cam 16 by means such as a resilient spring 18, is rotatably secured to a lever 19 pivotally mounted within the instrument case 4 at 20, and having at its opposite end a slotted portion 21. The slotted portion 21 engages a traversing member 22 constrained to move on guide rod 24 in a stright line path only. The traversing member 22 is secured directly to the cursor arm 11 within the cursor arm housing 12. The arm 11 projects from housing 12 to carry the cursor 10, as said above.

Within case 4 is also disposed an integrator 25 of the ball and disk type. Values proportional to movement of knob 14 are introduced to the integrator by means of a pinion 26 mounted on shaft 15 and engaging a rack 27, which controls the position of the integrator ball carriage 29.

Values proportional to the distance the chart has been traversed past the inspection station are also introduced to integrator 25 as rotations of the disk 30. The means utilized are a part of the reduction gearing system 31 feeding the worm and gear 7 thru which the motor 6 drives the chart paper, so that a constant proportion always exists between the values representing the true amount of chart traversal and those introduced to the integrator as disk rotations.

While it is desirable that the motor 6 should run at uniform speed for the convenience of the operator in accurately following the recorded curve, it will be seen that variations in speed will not interfere with the accuracy of the computations being performed by the machine, and a variable speed control may be provided to permit faster measurements where the curve is not changing rapidly.

These computations may be thought of as true integrations, since multiplications of values representing the square roots of the ordinates of the curve on chart 2 by values representing the increments of time introduced by motor 6 are continuously carried on to produce the rotational output of the integrator from cylinder 32.

The output of integrator 25 is registered on a revolution counter 34, which may be read by the operator of the machine through a window 35. A manual reset knob 36 allows zeroing the counter at the beginning of measurements on any particular strip. A switch 37 is also mounted on the case for the convenient use of the operator in stopping and starting the motor. A pivoted engaging member 39 may be provided to insure that the strip chart is held with its perforations 9 in engagement with the sprocket teeth 8 of the drum 5. Balls 40 freely rotatable in a cross-bar 41 may be provided to assist in maintaining the chart 2 in proper alinement as it passes the inspection station 3. Conventional means, not shown, may be used to guide the chart off the drum 5 after it has passed the inspection station.

It will be apparent that a registration might be made of the summation of powers other than the square root of the heights of the ordinates under a curve, by substituting for cam 16 a cam having its radius varying in proportion to the desired power of the angle through which the shaft 15 is turned. Similarly, registration of summations of any desired arbitrary function of the height of the ordinates of the curve may be obtained by using a cam whose radius is related as such function to the angle of rotation of shaft 15. As an example of this sort, the invention will integrate a function of the type:

$$\int \log_{10}\left(\frac{I_0}{I}\right) dv$$

where $$\log_{10}\left(\frac{I_0}{I}\right)$$

represents optical density and $v$ represents the frequency expressed in wave numbers.

I claim:

1. Apparatus for integrating a particular function of a curve on a strip chart, including, means for traversing the strip chart, a cursor disposed for transverse movement across the chart relative to the traversing movement to follow the curve recorded thereon, an input shaft adapted to be positioned for the cursor to follow the curve, a cam coupling the input shaft to the cursor and having a particular shape for converting the movements of the cursor in the transverse direction into a movement of the input shaft in the particular functional relationship, and an integrator for combining the movements of the input shaft and the traversing means to obtain an integral of the particular function.

2. Apparatus for integrating a particular function of a curve on a strip chart, including, a cursor movable in a first direction, means for producing a relative movement between the cursor and the strip chart in a second direction transverse to the first direction, an input shaft, a cam coupled to the shaft and having a peripheral shape with the particular functional relationship in comparison to the rotation of the shaft, means associated with the cam in driven relationship to the cam for converting the peripheral movement of the cam into corresponding movements of the cursor in the first direction, and an integrator for combining the angular rotation of the input shaft and the relative movement between the cursor and the strip chart in the second direction to obtain an integral of the particular function.

3. Apparatus for integrating a particular function of a curve on a strip chart, including, a cursor movable in a first direction, means for producing a relative movement between the cursor and the strip chart in a second direction transverse to the first direction, an externally controlled input shaft, a cam mounted on the shaft and having a peripheral configuration related as by the particular function to the angular rotation of the input shaft, means including a pivotable lever disposed in contiguous relationship to the cam and coupled to the cursor to convert the radial dimensions of the cam at any instant into corresponding displacements of the cursor in the first direction, and an integrator for combining the angular movements of the input shaft and the relative movements between the cursor and the strip chart in the second direction to obtain the integral of the particular function.

4. Apparatus as set forth in claim 3, in which a first member is rotatable in accordance with the relative displacements between the cursor and the strip chart in the second direction and in which a second rotatable member is disposed in contact with the first member at positions dependent upon the angular movement of the input shaft and in which the output is registered by a third member rotatably driven by the second member.

5. Apparatus for integrating a particular function of a curve on a strip chart, including, an inspection station, means for traversing the strip chart past the inspection station, a cursor disposed at the inspection station for movement in a transverse direction relative to the traversing movement of the strip chart, control means for moving the cursor across the chart to follow the curve recorded on the chart, means for coupling the control means and the cursor to produce a relative movement between the cursor and the control means in accordance with the particular function of the curve to be integrated, integrating means for combining the displacements representing the disposition of the control means and the displacements representing the variations in the traversal of the strip chart, and means for registering the output from the integrator.

6. Apparatus for integrating a particular function of a curve on a strip chart, including, means for traversing the strip chart, a cursor disposed for transverse movement across the chart to follow the curve recorded thereon, a cam for converting the movement of the cursor into the particular function of the curve on the chart, integrating means, means for introducing into the integrating means the functional values produced by said cam, means for introducing to said integrating means the variations in the traversal of said strip chart for combination with the functional values produced by said cam, and registering means for indicating the cumulative output of said integrating means.

7. Apparatus for integrating a particular function of a curve on a strip chart, including, an inspection station, means for traversing the strip chart past the inspection station, a cursor disposed at the inspection station for movement in a transverse direction relative to the traversing movement of the strip chart, means including an input shaft and a cam for guiding the movement of the cursor along the curve, the cam being shaped to convert the curve into the particular function of the curve as represented by the movements of the input shaft, an integrator for combining the movements of the input shaft and the movements of the strip chart past the inspection station, and means for registering the output of the integrator.

8. Apparatus as set forth in claim 7, in which the integrator includes a disc rotatable in accordance with the traversing movements of the strip chart and also includes rotary means movable radially along the disc in accordance with the movements of the input shaft and in which the registering means determines the rotary movement of the rotary means.

9. Apparatus for integrating a particular function of a curve on a strip chart, including, an inspection station, means for traversing the strip chart past the inspection station, a cursor movable in a transverse direction relative to the traversing movement of the strip chart to follow the curve on the chart, a rotary cam, coupling means disposed between the cam and the cursor to convert the rotary movement of the cam into a corresponding linear movement of the cursor, the cam being shaped to provide the particular functional relationship between the linear movement of the cursor and the angular movement of the cam, an integrator for determining the cumulative value of the angular movements of the cam in accordance with the traversing movement of the strip chart past the inspection station, and means for indicating the output from the integrator at any instant.

10. Apparatus for integrating a particular function of a curve on a strip chart, including, a cursor, means for producing a relative movement between the cursor and the strip chart in a first direction, means including a lever and a guide member for producing a relative displacement between the cursor and the strip chart to position the cursor on the curve at any instant, means including a rotary cam operative on the lever to position the cursor on the curve, the cam being shaped to obtain an angular movement representing the particular function of the relative transverse displacement between the cursor and the strip chart, and means movable in accordance with the angular movements of the cam and the relative movements between the cursor and the strip chart in the first direction to produce a displacement representing the integration of the function of the curve.

11. Apparatus as set forth in claim 10, in which the integrating means includes a first member rotatable in accordance with the relative movement between the cursor and the strip chart in the first direction and also includes a second member rotatable with the first member and positioned relative to the first member in accordance with the angular displacement of the cam.

12. Apparatus as set forth in claim 11 in which means are driven in accordance with the rotary movement of the second member in the integrating means to indicate the output from the integrating means.

References Cited in the file of this patent

UNITED STATES PATENTS

| | | |
|---|---|---|
| 1,087,915 | Bailey | Feb. 24, 1914 |

FOREIGN PATENTS

| | | |
|---|---|---|
| 749,270 | Germany | June 8, 1953 |